(12) United States Patent
Lee et al.

(10) Patent No.: US 11,742,720 B2
(45) Date of Patent: Aug. 29, 2023

(54) MOTOR PROVIDED WITH COOLING SYSTEM

(71) Applicants: HYUNDAI MOTOR COMPANY, Seoul (KR); KIA MOTORS CORPORATION, Seoul (KR)

(72) Inventors: Jae Hyeon Lee, Hwaseong-si (KR); Han Hee Park, Hwaseong-si (KR); Seong Min Kim, Changwon-si (KR); Hyun Woo Noh, Seoul (KR); Tae Il Yoo, Anyang-si (KR); Ji Wan Cha, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 196 days.

(21) Appl. No.: 16/921,157

(22) Filed: Jul. 6, 2020

(65) Prior Publication Data
US 2021/0067006 A1   Mar. 4, 2021

(30) Foreign Application Priority Data

Aug. 30, 2019 (KR) .................. 10-2019-0107016

(51) Int. Cl.
*H02K 9/193* (2006.01)
*H02K 5/20* (2006.01)
(Continued)

(52) U.S. Cl.
CPC .............. *H02K 9/193* (2013.01); *H02K 5/20* (2013.01); *H02K 9/19* (2013.01); *B60K 11/02* (2013.01)

(58) Field of Classification Search
CPC   H02K 9/193; H02K 3/24; H02K 1/20; H02K 5/203; H02K 5/20; H02K 9/00
See application file for complete search history.

(56) References Cited

U.S. PATENT DOCUMENTS

| | | | | |
|---|---|---|---|---|
| 5,619,956 A | * | 4/1997 | Koziara | ................. H02K 5/203 |
| | | | | 123/41.31 |
| 2012/0133222 A1 | * | 5/2012 | Han | ..................... B60L 3/0061 |
| | | | | 310/58 |

(Continued)

FOREIGN PATENT DOCUMENTS

| | | | |
|---|---|---|---|
| JP | 2003324901 A | * | 11/2003 |
| JP | 2010-080620 | | 4/2010 |

(Continued)

OTHER PUBLICATIONS

Ikeda (JP 2015130755 A) English Translation (Year: 2015).*
Hirasawa (JP 2003324901 A) English Translation (Year: 2003).*
Li (WO 2019156196 A1) English Translation (Year: 2019).*

*Primary Examiner* — Tulsidas C Patel
*Assistant Examiner* — Robert E Mates
(74) *Attorney, Agent, or Firm* — MORGAN, LEWIS & BOCKIUS LLP

(57) ABSTRACT

A motor with a cooling system is provided. The motor includes a cooling system cooling a stator with coils wound on a core, in which the cooling system includes a plurality of spray pipes having a plurality of holes and spraying oil through the holes, the plurality of spray pipes is positioned between the stator and a housing of the motor, and the plurality of spray pipes includes pipes disposed at a center over the stator and at both sides spaced apart from each other in a circumferential direction of the stator from the center with predetermined gaps therebetween.

17 Claims, 21 Drawing Sheets

(51) Int. Cl.
*H02K 9/19* (2006.01)
*B60K 11/02* (2006.01)

(56) References Cited

U.S. PATENT DOCUMENTS

2012/0161555 A1* 6/2012 Sawada ................ H02K 3/522
310/54
2014/0346905 A1* 11/2014 Matsui .................. H02K 5/203
310/54

FOREIGN PATENT DOCUMENTS

| JP | 5740311 | | 6/2015 |
|----|---------|---|--------|
| JP | 2015130755 A | * | 7/2015 |
| WO | WO-2019156196 A1 | * | 8/2019 |

* cited by examiner

[ OIL FLOW ON FRONT SIDE (FROM CENTER) ]

[ OIL FLOW ON FRONT SIDE (FROM FRONT) ]

MOTOR PROVIDED WITH COOLING SYSTEM

CROSS-REFERENCE TO RELATED APPLICATION

The present application claims priority to and the benefit of Korean Patent Application No. 10-2019-0107016, filed Aug. 30, 2019, which is incorporated herein by reference in its entirety.

TECHNICAL FIELD

The present disclosure relates to a motor and, more particularly, to a motor that can more efficiently cool parts thereof using oil.

BACKGROUND

The statements in this section merely provide background information related to the present disclosure and may not constitute prior art.

As known in the art, a pure electric vehicle (EV), a hybrid vehicle (HEV/PHEV), and a fuel cell vehicle (FCEV) that are environment-friendly vehicles are, in a broad meaning, all electric vehicles that are driven using an electric motor.

Environment-friendly vehicles are equipped with a motor that is a driving source for driving the vehicle and an inverter that drives and controls the motor by converting a DC current from a high-voltage power source into an AC current and applying the AC current to the motor.

As described above, environment-friendly vehicles generate power for driving using a motor and the motor that drives environment-friendly vehicles, that is, a driving motor requires high efficiency and output density.

The efficiency of driving motors in environment-friendly vehicles that are recently developed is known as about 90% and the other loss is mostly converted into heat.

Accordingly, a stable heat management system is necessary to satisfy continuous requirements of downsizing, increasing the output, and increasing the efficiency of motors.

Since a large amount of heat is generated by a coil, etc. when a motor is driven, it is necessary to cool main parts including the coil, and it is important to cool an interior permanent magnet synchronous motor (IPMSM) that is widely used as the driving motor of vehicles in terms of efficiency of a motor and protection of main parts (a permanent magnet, a coil, etc.).

When the temperature of a permanent magnet becomes a predetermined level or more, de-magnetization of the permanent magnet occurs and the intensity of magnetism decreases, which has large influence on the efficiency of a motor, etc.

As a result, overheating in which a motor system exceeds an allowable temperature occurs, or it is required to manage heat of a motor system in order to prevent de-magnetization of a permanent magnet of a motor, and accordingly, a heat management system is required.

A heat management system for a motor, particularly, a motor cooling system can be classified into an air-cooling type, a water-cooling type, and an oil-cooling type in accordance with the coolant, and can be classified into a scattering type using rotation of a motor and a pressure feed type using a hydraulic pump in accordance with the spraying type.

Further, the motor cooling system can also fall into a direct cooling type and an indirect cooling type, and recently, the direct cooling type is used a lot due to the demand of high cooling efficiency.

In addition, various studies about improvement of a cooling spray structure for optimization of cooling or development of a cooling-assistant structure have been actively conducted.

However, in automotive driving motors that use a direct cooling type with oil, specific portions of the motors may be burned out by overheating due to non-uniform distribution of cooling oil.

Despite application of a protection logic against overheating, it is impossible to sense temperature of all portions of a motor, so there is still a danger of burning-out of specific portions.

Accordingly, there is a need for a technology of modeling temperature of each portion in real time and an efficient cooling technology of enabling oil to be uniformly distributed.

According to the related art, when cooling oil flows down on the wall of a motor housing, much oil is wasted without cooling a coil, and there is a defect in terms of circulation such as that oil flows down in a lump only at a side a core without uniformly cooling the entire core.

Accordingly, it is required to improve the spray range and the position and angle of a hole of a pipe in the related art when spraying oil supplied by a pump to parts of a motor such as a stator through the hole.

The positions and angles of holes in cooling systems of the related art have a problem in that oil is not supplied well to the upper portion and the lower portion of a stator core of a motor and accordingly cooling is not performed or insufficient.

When the supply amount of oil is insufficient, cooling is not normally performed, so electrical breakdown may occur at a coil and a core, which may cause a fatal problem with not only a motor system, but also safety of a vehicle itself. Accordingly, it is required to not only secure safety of a vehicle, but improve the quality and commercial value of a vehicle by improving a cooling system.

SUMMARY

A motor in oneform of the present disclosure includes a cooling system cooling a stator with coils wound on a core, in which the cooling system includes a plurality of spray pipes having holes and spraying oil through the holes, the plurality of spray pipes are positioned between the stator and a housing of the motor, and includes pipes disposed at a center over the stator and at both sides spaced apart from each other in a circumferential direction of the stator from the center with predetermined gaps therebetween.

In some forms of the present disclosure, the cooling system may further include an oil guide disposed at an upper portion of a front side of the stator core in a circumferential direction of the stator core and guiding flow of oil sprayed from the holes of the spray pipes.

Therefore, in some forms of the present disclosure, an additional spray pipe disposed at the center portion above the motor to spray oil vertically downward and an oil guide for guiding sprayed oil are provided, so there is an effect that it is possible to more efficiently cool parts thereof using oil.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
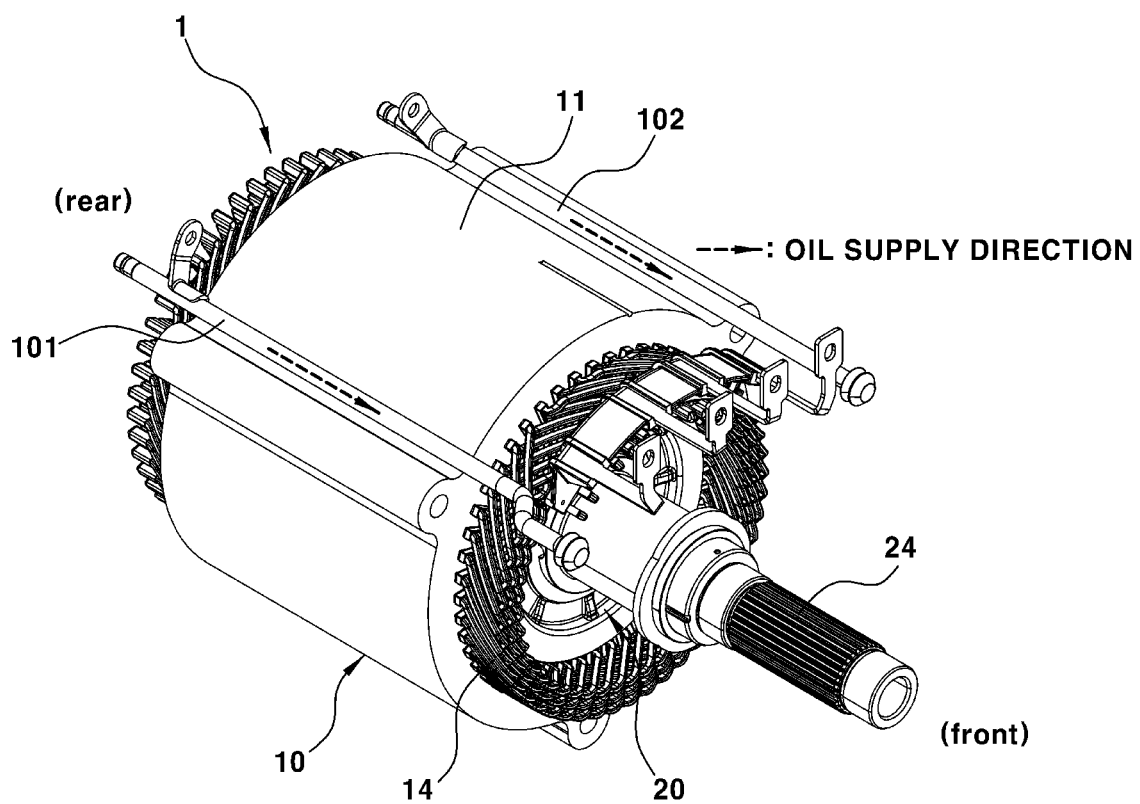
FIGS. 1 to 3 are views showing a motor and a cooling system thereof in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the present specification, unless explicitly described otherwise, "comprising" any components will be understood to imply the inclusion of other components rather than the exclusion of any other components.

First, a motor cooling system of the related art is briefly described to help understand the present disclosure.

Figure 2:
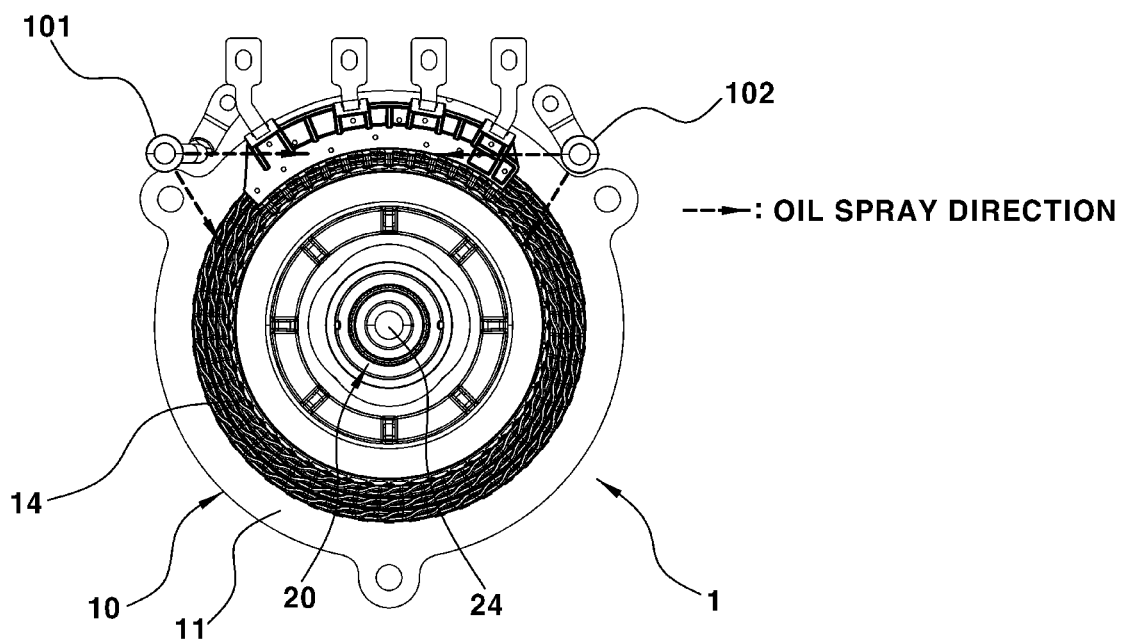
Figure 3:
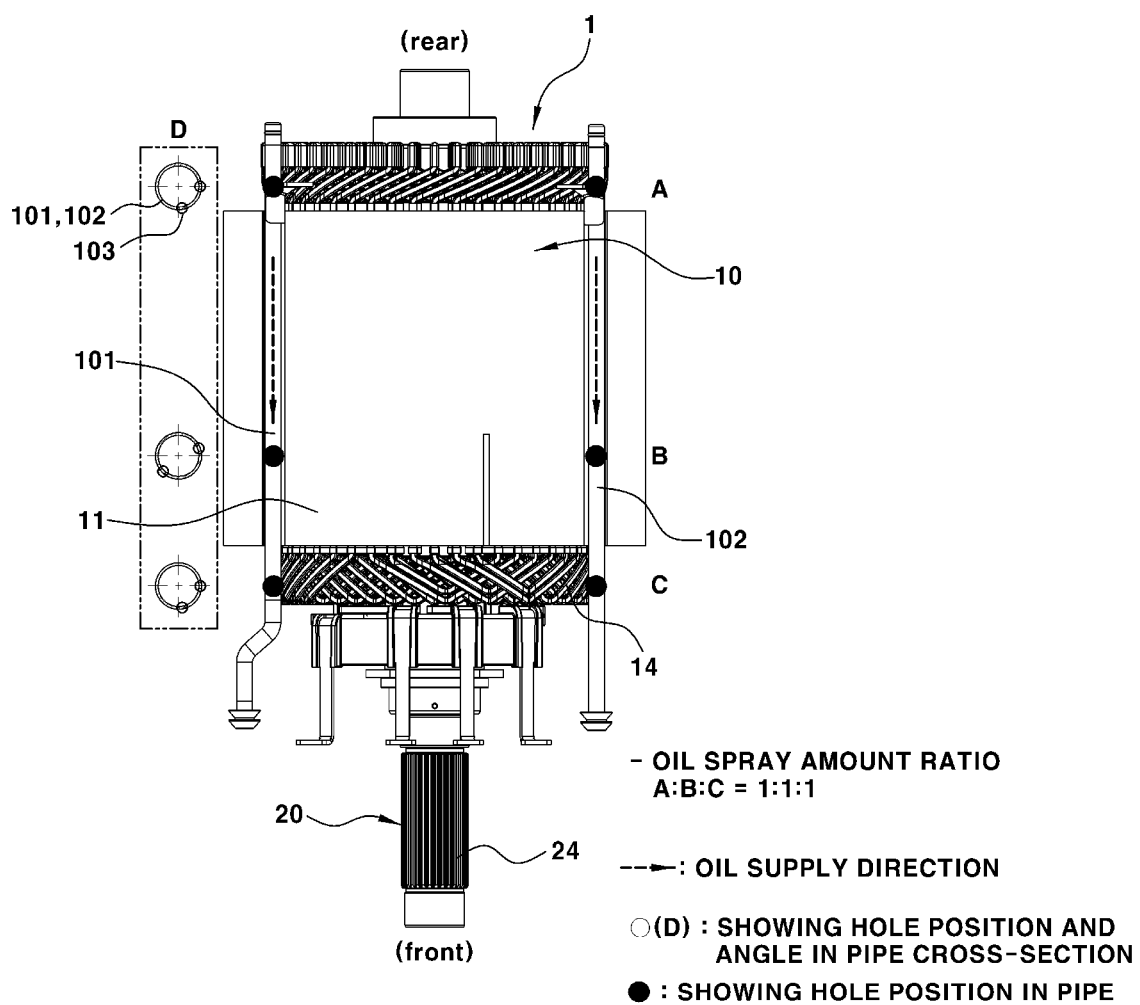

FIGS. 1 to 3 are views showing a motor and a cooling system of the related art, that is, FIG. 1 is a perspective view of the motor and the cooling system, FIG. 2 is a front view of the motor and the cooling system, and FIG. 3 is a plan view of the motor and the cooling system.

In the following description, as shown in FIGS. 1 to 3, the side to which a shaft 24 of a rotor 20 of a motor 1 protrudes is referred to as 'front' and the opposite side is referred to as 'rear'.

Figure 4:
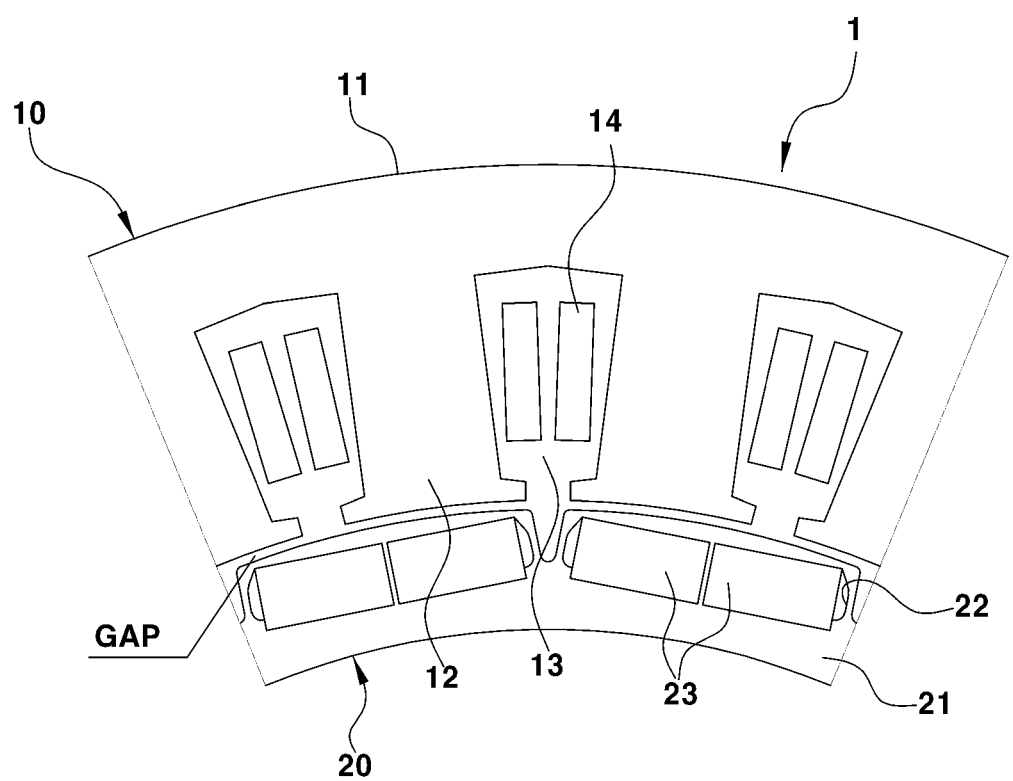
FIG. 4 is a cross-sectional view showing the configuration of a motor known in the art.

FIG. 4 is a cross-sectional view of the configuration of a motor known in the art, that is, shows the configuration of an interior permanent magnet synchronous motor (IPMSM) that is widely used the driving motor of environment-friendly vehicles.

An interior permanent magnet synchronous motor may be used as the driving motor that is a driving source of environment-friendly vehicles, and more detail, an interior permanent magnet synchronous motor in which a permanent magnet is embedded in a rotor may be used.

As shown in FIG. 4, an interior permanent magnet synchronous motor includes a stator 10 and a rotor 20.

The stator 10 may include a core 11 and a coil 14 wound on teeth 12 of the core 11 and the rotor 20 may include a core 21 and permanent magnets 23 embedded in or attached to the core 21.

Referring to FIG. 4, it can be seen that the teeth 12 are formed with regular intervals circumferentially inside the stator core 11, in which a slot 13 is formed each between adjacent teeth 12.

Further, the coil 14 is wound on the teeth 12, that is, the coil 14 is wound on the teeth 12 through the slots 13, so the coil 12 can be wound on the teeth 12 and accommodated in the slots 13 in the stator core 11.

The rotor 20 is disposed inside the stator 10 with a gap from the stator core 11, insertion holes 22 are circumferentially formed at the rotor core 21, and the permanent magnet 23 is inserted in each of the insertion holes 22 of the rotor core 21.

The cooling system shown in FIGS. 1 to 3 uses a type in which oil that is supplied from a pump (not shown) is sprayed through holes 103 of two pipes 101 and 102 disposed at 2 o'clock and 10 o'clock over the motor 1 and cools motor parts such as the stator 10 rather than a type that uses churning and scattering of oil by the rotor 20.

In FIG. 3, the part D' shows cross-sectional shapes at longitudinal predetermined positions on the pipes 101 and 102, that is, shows the positions and angles of the holes 103 in the cross-sectional shapes at the positions on the pipes 101 and 102.

Referring to the part D', it can be seen that the spray direction and angle of oil from the positions of the holes 103 in the cross-sections of the pipes 101 and 102 depend on corresponding positions of the pipes (the positions of the holes).

Further, the spray amount of oil at corresponding positions of the pipes may depend on the number and diameter of the holes 103 at each position of the pipes 101 and 102.

However, the spray position and spray angle of oil for cooling the stator core 11 and the coil 14 are not optimized in the cooling types of the related art, so there is a defect that the cooling performance is poor.

That is, since the spray angle of oil is not optimized, the oil sprayed through the holes 103 of the pipes 101 and 102 hits a housing (not shown) without hitting the stator core 11 and flows down. Accordingly, there is a problem that much oil is not actually used for cooling, whereby the cooling performance is deteriorated.

Further, there is a defect that much oil flows down in a lump on the side of the stator core 11, but oil is not supplied well to the core wall at the front side and the rear side (the front end and the rear end of the core).

Further, two pipes 101 and 102 are positioned in parallel at 2 o'clock and 10 o'clock and oil is sprayed down and to a side from the two pipes 101 and 102, but the oil does not reach well the upper portion of the stator core 11, so it is difficult to smoothly cool the upper portion of the stator core 11.

Further, the same amount of oil is sprayed to the rear side, the center portion, and the front side regardless of the required cooling performance in the cooling types of the related art.

That is, the holes 103 are formed at the longitudinal rear portions, front portions, and middle portions of the pipes 101 and 102, but the numbers and diameters of the holes at each position are the same, so the same amount of oil is sprayed at the rear portion, front portion, and middle portion (the ratio of oil spray amount 'A:B:C=1:1:1' in FIG. 3).

In this case, there is an effect that oil partially spreads and flows on the rear side of the motor 1 by a hairpin molding structure and an insulating paper, but it is required to optimize the position, angle, and number of the oil spray holes 103. Further, since there is a problem that oil flows down in a lump on the side of the motor, it is required to improve flow and circulation of oil.

In particular, oil should uniformly permeate between coils for cooling on the front side where much heat is generated by the coil 14 due to the current that is applied to the motor, but most oil flows down on the outer side of the coil and the housing and is then wasted, so severe problems such as electrical breakdown of the motor may be caused.

Accordingly, in order to solve all the problems described above, the present disclosure optimizes not only the ratio of oil spray amounts on the rear side, the center portion, and front side of a stator, but also the oil spray angle and spray amount of oil at each position on pipes.

Further, the present disclosure includes an oil guide for guiding oil flow and an oil dam for temporarily collecting oil so that a stator can be cooled with the lower portion thereof immersed in oil.

Accordingly, it is possible to minimize unnecessary oil flow, maximize cooling performance on the front side that is vulnerable in cooling, maintain the entire oil spray amount at the same level as motors of the related art, and increase oil sticking on the front wall of a core and improve cooling performance for a coil.

Hereinafter, forms of the present disclosure are described in detail with reference to the accompanying drawings.

Figure 5:
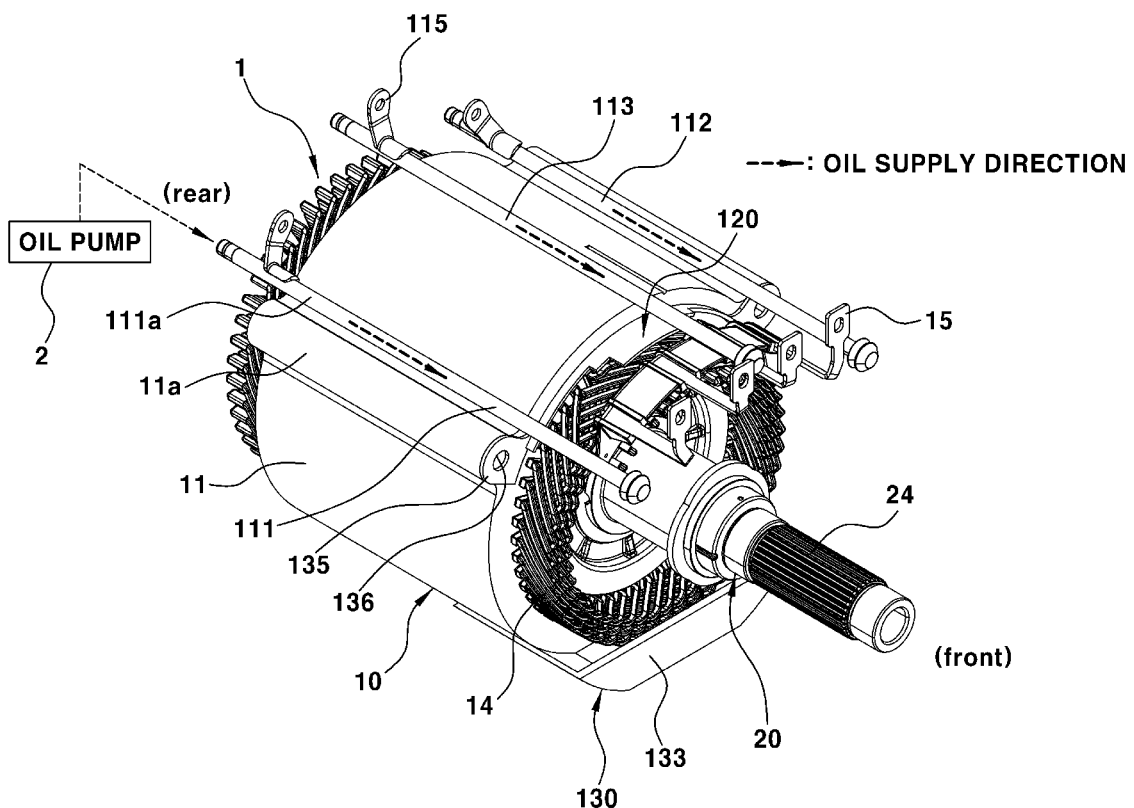
FIG. 5 is a perspective view showing a motor and a cooling system thereof in oneform of the present disclosure.
Figure 6:
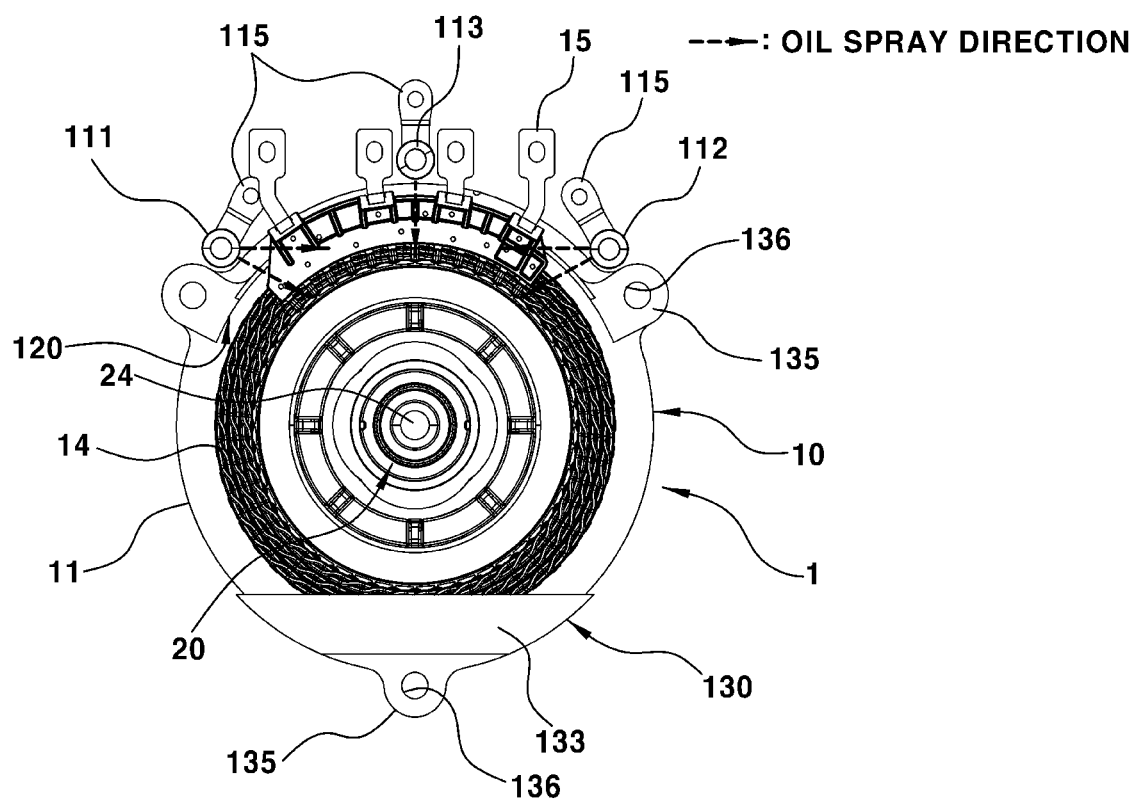
FIG. 6 is a front view showing the motor and the cooling system thereof in oneform of the present disclosure.
Figure 7:
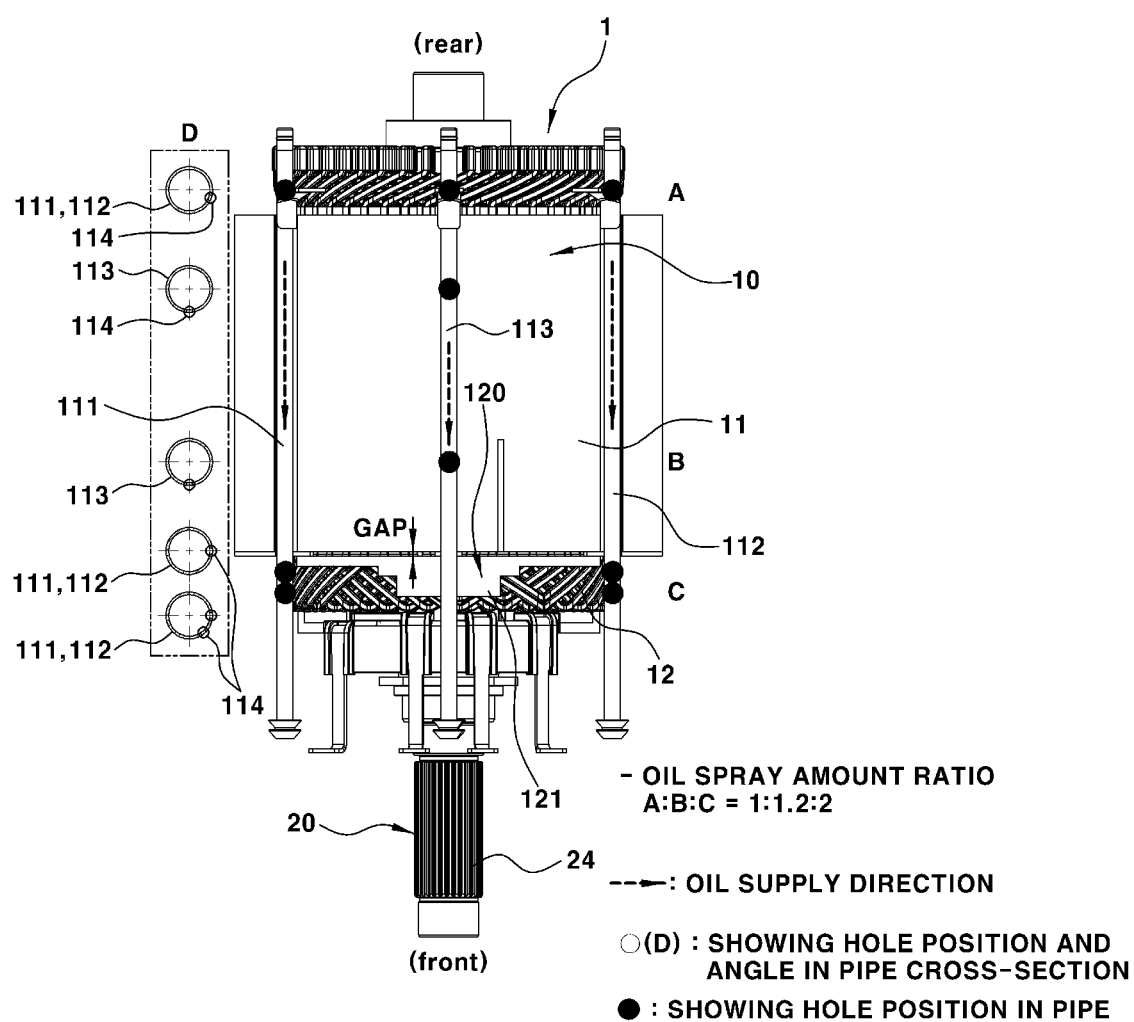
FIG. 7 is a plan view showing the motor and the cooling system thereof in oneform of the present disclosure.

FIGS. 5 to 7 are views showing a motor and a cooling system thereof in some forms of the present disclosure, in which FIG. 5 is a perspective view showing the motor and the cooling system thereof in some forms of the present disclosure, FIG. 6 is front view, and FIG. 7 is a plan view.

A stator and a rotor of parts of the motor are exemplified in FIGS. 5 to 7.

Figure 8:
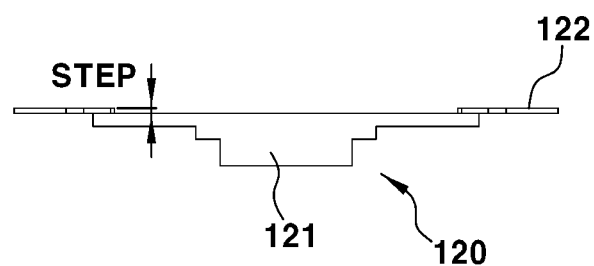
FIG. 8 is a plan view showing an oil guide in a cooling system of a motor in oneform of the present disclosure.
Figure 9:
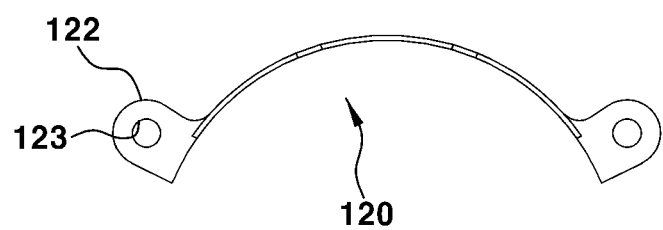
FIG. 9 is a front view showing the oil guide in a cooling system of a motor in oneform of the present disclosure.

FIG. 8 is a plan view showing an oil guide in a cooling system of a motor in some forms of the present disclosure and FIG. 9 is a front view showing the oil guide.

Figure 10:
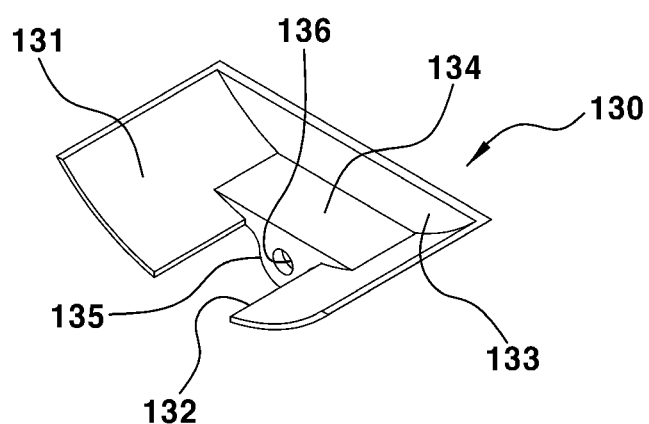
FIG. 10 is a perspective view showing an oil dam in a cooling system of a motor in oneform of the present disclosure.
Figure 11:
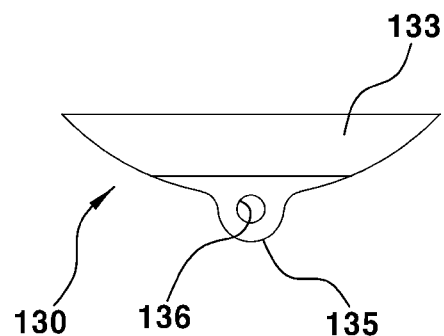
FIG. 11 is a front view showing the oil dam in a cooling system of a motor in oneform of the present disclosure.
Figure 12:
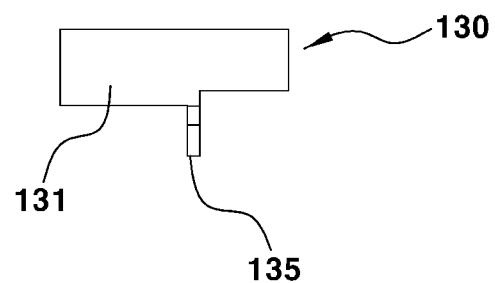
FIG. 12 is a side view showing the oil dam in a cooling system of a motor in oneform of the present disclosure.

FIG. 10 is a perspective view showing an oil dam in a cooling system of a motor in some forms of the present disclosure, FIG. 11 is a front view showing the oil dam, and FIG. 12 is a side view showing the oil dam.

The motor 1 in some forms of the present disclosure may be a driving motor that is a driving source of environment-friendly vehicles.

Further, the motor 1 in some forms of the present disclosure may be a permanent magnet synchronous motor with permanent magnets embedded or attached, and may be an interior permanent magnet synchronous motor that is widely used as the driving motors of environment-friendly vehicles of permanent magnet synchronous motors.

The motor 1 in some forms of the present disclosure has little difference from permanent magnet synchronous motors known in the art in that a stator 10 and a rotor 20 are included, the stator 10 includes a stator core 11 and a coil 14, and the rotary 20 includes a rotor core (21 in FIG. 4) and permanent magnets (23 in FIG. 4).

The motor 1 in some forms of the present disclosure includes a cooling system that cools parts such as the stator 10 by spraying oil thereto and the cooling system includes a plurality of spray pipes 111, 112, and 113 having holes 114 to spray oil to the stator 10 through the holes 114.

The spray pipes 111, 112, and 113 are provided to be supplied with oil through pipelines that is fed under pressure by an oil pump 2 and to spray the oil to parts of the motor such as the stator 10 through the holes 114.

In the motor 1 in some forms of the present disclosure, the spray pipes 111, 112, and 113 are positioned between the stator 10 and a motor housing (not shown) and are arranged with predetermined intervals over the center of the stator 10 and at both sides spaced apart from the center in the circumferential direction of the stator.

The motor housing is a well-known component of motors, so it is not shown in the figures.

In more detail, the cooling system in some forms of the present disclosure includes a plurality of spray pipes 111, 112, and 113 arranged in parallel over the motor 1 and the spray pipes 111, 112, and 113 are elongated forward and rearward over the motor 1.

In the following description, the forward area and the front side of the motor 1 is the side to which a shaft 24 of the rotor 20 protrudes and the rearward area and the rear side is the opposite side, and referring to FIGS. 5 and 7, it can be seen that the shaft 24 of the rotor 20 protrudes forward from the motor 1.

The front and rear directions are applied in the same way to the spray pipes 111, 112, and 113 of the cooling system in the following description.

Referring to FIGS. 5 and 7, it can be seen that the coil 14 is wound to protrude a predetermined width rearward from the rear end of the stator core 11 behind the stator 10, and similarly, it can be seen that the coil 14 is wound to protrude a predetermined width forward from the front end of the stator core 11 ahead of the stator 10.

In the structure in which the coil 14 is wound to protrude forward and rearward from the stator core 11, the shape of the portion of the coil protruding forward from the stator core 11 and the shape of the portion of the coil protruding rearward from the core 11 both may be a cylindrical shape.

In some forms of the present disclosure, the cooling system may include three spray pipes 111, 112, and 113 elongated forward and rearward and arranged in parallel over the stator 10, in which the spray pipes may include a first pipe 111 elongated forward and rearward at the left side above the stator 10, a second pipe elongated forward and rearward at the right side above the stator 10, and a third pipe 113 elongated forward and rearward at the center over the stator 10.

Referring to FIG. 5, it can be seen that the third pipe 113 is positioned at 12 o'clock, the first pipe 111 is positioned at 10 o'clock, and the second pipe 112 is positioned at 2 o'clock when seen from the front of the motor 1.

In some forms of the present disclosure, oil fed under pressure by an oil pump 2 is supplied into the spray pipes 111, 112, and 113, and the spray pipes 111, 112, and 113 may be provided so that oil can be supplied from the rear side to the front side by the oil pump 2.

The rear ends of the spray pipes 111, 112, and 113 are connected to the oil pump 2 through separate pipelines (not shown), so the oil fed under pressure by the oil pump 2 can be supplied into the pipes 111, 112, and 113 through the rear ends of the pipes, in which the front ends of the pipes may be closed, that is, may have a closed structure.

Further, the spray pipes 111, 112, and 113 may be mounted to be coupled and fixed to the motor housing (not shown) by brackets 115 disposed at a side.

In FIGS. 5 and 6, reference numeral '15' indicates bus bars that are connected to the coils 14 and used for electrical connection of the coils, and the bus bars 15 may be positioned on the front side of the motor 1.

Further, in some forms of the present disclosure, holes 114 for spraying oil are longitudinally formed at predetermined positions with predetermined intervals in each of the spray pipes 111, 112, and 113, and the position, angle, number, and size (diameter) of the holes 114 are optimized in each of the spray pipes 111, 112, and 113.

In the cooling systems of the related art, the same number and the same size of holes are formed at the front, rear, and middle on each spray pipe such that the same amount of oil is sprayed through the spray pipes at the front side, rear side, and middle portion of a motor.

However, in the cooling system in some forms of the present disclosure, a hole 114 may be formed at each of the front portion (the portion C in FIG. 7) and the rear portion (the portion A in FIG. 7) in the front-rear longitudinal direction of the first pipe 111 and the second pipe 112, and a hole 114 may be formed at the rear portion (the portion A) and the middle portion (the portion B in FIG. 7) in the front-rear longitudinal direction of the third pipe 113.

The front-rear longitudinal direction of the pipe is the same as the front-rear direction of the motor (stator and stator core), so the middle portion in the front-rear longitudinal direction of third pipe 113 may mean the middle portion front-rear longitudinal direction of motor and may mean the middle portion between the front portion (A) and the rear portion (C) of the pipe.

In short, a hole 114 is formed at the rear portion (the portion A) of each of the first pipe 111, the second pipe 112, and the third pipe 113, a hole 114 is formed at the front portions (the portion C) of the first pipe 111 and the second pipe 112 except for the third pipe 113, and the hole 114 at the middle portion (the portion B) is formed only at the third pipe 113.

The holes 114 formed at the rear portions A of the pipes 111, 112, and 113 may be formed to be positioned right over the portion of the coil protruding rearward from the stator core 11, so oil discharged through the holes at the rear portions of the pipes can be sprayed the portion of the coil protruding rearward.

Further, the holes 114 formed at the front portions C of the first pipe 111 and the second pipe may be formed to be positioned right over the portion of the coil protruding forward from the stator core 11, so oil discharged through the holes at the front portions C can be sprayed to the portion of the coil protruding forward.

Further, the third pipe 113 may be elongated forward and rearward at the center portion in the left-right direction of the stator core, and the hole 114 formed at the middle portion B of the third pipe 113 may be formed to be position right over not the portion of the coil protruding forward and rearward, but the stator core 11.

In some forms of the present disclosure, the hole 114 formed at the middle portion B between the front and the rear of the third pipe 113 may be formed to be disposed at at least one or more positions of equally divided positions of the front-rear length of the stator core 111 when the front-rear length is equally divided in predetermined sections.

A plurality of holes positioned at front and rear portions may be formed in the middle portion B of the third pipe 113, for example, a total of 2 holes 114 of one at each of front and rear portions may be formed in the middle portion B of the third pipe.

In some forms of the present disclosure, the two holes 114 positioned at the front and rear portions in the middle portion B of the third pipe 113 may be positioned respectively at about ¼ point and ¾ point of the front-rear length of the stator core 11 when the front-rear length is equally divided into four sections.

In more detail, the holes 114 may be formed such that their centers are positioned at predetermined distances rearward from the ¼ point and the ¾ point, for example, at about 2.5 mm rearward from the ¼ point and the ¾ point, and the diameter of the holes 114 may be 2 mm (2ϕ).

In this configuration, one hole 115 may be formed ate the rear portion A of the third pipe 113, and the hole at the rear portion A of the third pipe 113 and the holes 115 of the first pipe 111 and the second pipe 112 except for the two holes 115 formed at the middle portion B of the third pipe 113 may be formed in the same size.

Further, in some forms of the present disclosure, all the holes of the third pipe 113 may be positioned at the lower ends of the cross-sections at the spray positions to spray oil vertically downward.

Further, one hole 114 may be formed at the rear portion A of each of the first pipe 111 and the second pipe 112, and the holes 114 may be formed at position where oil can be sprayed downward at an angle toward the center in the cross-sections of the pipes.

Alternatively, two holes may be formed to be positioned in the same cross-section at the rear portion of each of the first pipe 111 and the second pipe, and in this case, the two holes may be formed such that one of the holes horizontally sprays oil and the other one sprays oil downward at an angle.

In some forms of the present disclosure, the hole 114 at the rear portion A of the first pipe 111 and the hole 114 at the rear portion A of the second pipe 112 may be formed to be positioned at an angle about 20° from the horizon (see FIG. 7).

Further, a plurality of holes 114 may be formed at the front portion A of each of the first pipe 111 and the second pipe 112, and in this case, the plurality of holes 114 may be formed such that at least two or more of the holes are positioned in the same cross-section.

Further, the other holes of the plurality of holes 114 may be formed behind the holes positioned in the same cross-section.

Further, at least one of the holes 114 formed to be positioned in the same cross-section may be formed to spray oil horizontally or in a predetermined first inclination direction close to the horizon and the other hole may be formed to spray oil in a second inclination direction that is a direction set downward further than the first inclination direction.

The other holes positioned behind the holes 114 positioned in the same cross-section may be formed to spray oil horizontally or a predetermined third inclination direction.

In some forms of the present disclosure, three holes 114 may be formed at the front portion C of each of the first pipe 111 and the second pipe 112, and in this case, two of the three holes 114 may be formed in the same cross-section at a front portion in the front portions C of each of the pipes 111 and 112, and the other one hole 114 may be formed to be positioned behind the two holes.

The two holes positioned in the same cross-section at the front portion of the three holes 114 formed at the front portion C of each of the pipes 111 and 112 may be formed to spray oil at an angle downward from the horizon, and the one hole positioned behind the two holes may be formed to horizontally spray oil (see FIG. 7).

That is, one hole that can horizontally spray oil is formed at the front portion and the rear portion of the front portion C of each of the pipes 111 and 112, and one hole 114 that can spray oil downward at an angle toward the center is further formed at the front portion.

Further, in some forms of the present disclosure, when a hole that sprays oil downward at an angle toward the center of the two holes 114 at the front portion of the front portion C of each of the pipes 111 and 112 may be formed to be positioned at 50° from the horizon.

Further, in the cooling system of the motor in some forms of the present disclosure, the oil that is sprayed from the holes 114 at the rear portions A of the first pipe 111, the second pipe 112, and the third pipe 113, the oil that is sprayed from the hole 114 at the middle portion B of the third pipe 113, and the oil that is sprayed from the holes 114 at the front portions C of the first pipe 111 and the second pipe 112 can be sprayed with a predetermined ratio.

The total amount of oil that is sprayed from the holes at the rear portions A of the pipes 111, 112, and 113 is referred to as a 'rear portion spray flow rate', the total amount of oil that is sprayed from the hole at the middle portion B of the third pipe 113 is referred to as a 'middle portion spray flow rate', and the total amount of oil that is sprayed from the holes at the front portions of the first pipe 111 and the second pipe 112 is referred to as a 'front portion spray flow rate'.

The rear portion spray amount, middle portion spray amount, and front portion spray amount are the same as the ratio of 1:1:1 in cooling systems of the related art, but in some forms of the present disclosure, the rear portion spray amount, middle portion spray amount, and front portion spray amount may be set as 1:1.2:2.

That is, the oil spray amount at the front portion of the stator 10 is set larger than that at the rear portion or the middle portion so that the oil guide 120 and the oil dam 130 to be described below can be effectively used.

As described above, the spray flow rates at the rear portion, middle portion, and front portion may be set in the ratio of 1:1.2:2 so that the oil guide and the oil dam can be effectively used, and the number, the sizes, the front-rear positions, and the positions in a cross-section (spray angles) of the holes of each pipe can be optimized such that oil can be distributed in the ratio.

Further, in some forms of the present disclosure, when oil is sprayed through the holes of the first pipe and the second pipe, the oil is not sprayed vertically downward, but sprayed at spray angles that depend on the oil supply pressure and spray pressure at the positions of the holes, and the positions of the holes of the pipes are determined in consideration of the spray angles according to the oil supply pressure, so more efficient cooling performance can be achieved at the same flow rate.

On the other hand, the motor 1 in some forms of the present disclosure includes an oil guide 120 that guides the flow of oil sprayed to the front side of the stator 10 from the front portions C of the spray pipes 111 and 112, and an oil dam 130 that temporarily collects oil so that the stator 10 can be cooled with the lower portion at least partially immersed in the oil.

The oil guide is described first with reference to FIGS. 8 and 9. The oil guide 120 is positioned ahead of and above the stator core 11.

The oil guide 120 is fastened to a housing connecting portion 11a of the stator core 11, and the housing connecting portion 11a, which is a portion fastened to the motor housing (not shown), protrudes from the stator core 11, as shown in FIG. 11.

The stator core can be integrally mounted and fixed to the motor housing by coupling a fastener (not shown) inserted in the housing connecting portion 11a of the stator core 11 to the motor housing, and the fastener may be a long bolt or a rod type bolt that can be inserted deep in the housing connecting portion 11a.

In order to achieve excellent cooling performance using sprayed oil in some forms of the present disclosure, as shown in FIGS. 5 and 7, the oil guide 120 may be formed with a predetermined length circumferentially on the upper portion of the front side of the stator 10 of the motor 10.

The oil guide 120 may be a plate-shaped member made of a plate material, and as shown in FIG. 9, it may be a member having an arc shape forming a curve with a predetermined curvature.

In this configuration, a fastening portion 122 that are coupled and fixed to the housing connecting portion 11a of the stator core 11 may be formed at both ends of the oil guide 120.

The fastening portions 122 of the oil guide 120 are each formed in a shape with a through-hole 123 through which the fastener can be inserted, and are attached to the front end of the housing connecting portion 11a of the stator core 11 and then can be integrally fixed to the stator core 11 by the fasteners inserted into the housing connecting portion 11a through the through-holes 123.

In some forms of the present disclosure, the oil guide 120 guides the flow of oil such that the oil hits the oil guide and then uniformly spreads after being sprayed through the hole 114 at the front portion C of the first pipe 111 and the hole 114 at the front portion C of the second pipe 112, so the spreading oil can efficiently cool the stator 10 (the core and the coil).

The oil guide 120 has a predetermined width at each portion in the longitudinal direction, and may have an enlarging portion 121 having a width larger than those of other both ends, at the center portion.

In some forms of the present disclosure, the enlarging portion 121 of the oil guide 120 may have a shape of which the width increases like in a step shape toward the longitudinal center from both ends, as shown in FIG. 8.

Further, a predetermined step may be formed between the attachment surfaces of the fastening portions 122 at both ends of the oil guide 120 and the edges of the other portions of the oil guide 120 (see FIG. 9), and the step at both ends may be 2 mm.

Accordingly, when the fastening portions 122 of the oil guide 120 is attached to the housing connecting portion 11a of the stator core 11, a gap, for example, a gap of 2 mm may be defined as large as the step between the rear edge of the oil guide 120 and the front end surface of the stator core (see FIG. 7).

Further, the width of the other portions at both sides except for the enlarging portion 121 of the oil guide may be 5 mm.

Accordingly, when the oil guide 120 is mounted on the upper portion of the stator 10, some of oil can be sprayed to the top surface of the oil guide from the holes 114 at the front portions C of the spray pipes (the first pipe 111 and the second pipe 112), and the oil can sprayed to the top surface of the oil guide can flow down along the oil guide.

Some of the oil sprayed to the top surface of the oil guide 120 can flow down through the gap (see FIG. 7, for example a gap of 2 mm) from the front end surface of the stator core 11, so the oil can flow down on the front end surface of the stator 11 after passing through the gap.

Further, oil flooding at the center portion of the stator 10 after being sprayed through the holes 114 at the front portions C of the spray pipes 111 and 112 can be guided not only to the center of the front side of the stator core 11 from the enlarging portion 121 of the oil guide 120, but also to both ends of the oil guide 120 over the top surface of the oil guide 120. Accordingly, the amount of oil that spatters out or drops in a lump after being sprayed and hitting the stator 10 can be minimized.

Further, the oil guide 120 may be formed to have a predetermined width, as described above, for example, a width of at least 5 mm throughout the entire section in the longitudinal direction so that the oil directly sprayed to the top surface thereof can flow and spread over the top surface.

Further, the oil guide 120 blocks oil that flies outside by hitting the coil 114 after being sprayed from the holes 14 of the spray pipes 111 and 112 so that the oil can be reused for cooling.

Further, when the oil guide 120 is disposed circumferentially on the upper portion of the stator 10, a predetermined gap, for example, a gap of 10 mm may be defined between the oil guide 120 and (the outer portion) of the coil 14 under the oil guide 120 to prevent thermal deformation of the oil guide 120 due to an increase in temperature of the coil.

Further, the oil guide 120 guides also the flow of the oil sprayed from the holes the spray pipe disposed at the center over the stator 10, that is, the holes 114 of the third pipe 113.

That is, at least some of the oil sprayed to the stator core 11 through the holes 114 of the third pipe 113 is allowed to flow to the surface of the oil guide 120 over the gap from the surface of the stator core 11 without flowing down through the gap. To this end, the size of the gap between the oil guide 120 and the front end surface of the stator core 11 is set such that the whole oil does not flow down outside through the gap.

As a result, the oil sprayed to the stator core 11 from the third pipe 113 moves from the surface of the stator core 11 to the surface of the oil guide 120 and then moves to both longitudinal end along the surface of the oil guide 120, that is, follows down in the circumferential direction of the stator and then moves to the stator core 11 or the coil 14.

As described above, some of the oil sprayed through the third pipe 113 can also be guide to the stator core 11 or the coil 14 by the oil guide 120, and cooling is performed by the guided oil too.

On the other hand, as shown in FIG. 5, the oil dam 130 having a predetermined height is disposed under the stator 10 and oil is collected in the oil dam 130 at a level such that the lower portion of the stator 10 can be immersed.

The oil dam 130 is provided to further improve the cooling performance using the sprayed oil, and when oil is collected in the oil dam 130, the lower portion of the stator 10 can be immersed in the oil in the oil dam 130.

The oil dam 130 is a structure that enables the oil dropping down from the stator 10 to temporarily stay therein such that the core portion and the coil portion at the lower portion of the stator 10 can be immersed and cooled in the colleted oil, and a fastening portion 135 having a through-hole 136 is formed at the lower end of the oil dam 130, similar to the oil guide.

Accordingly, the fastening portion 135 is attached to a housing connecting portion (not shown) formed at the lower end of the stator core 11 and then fastened by a fastener (not shown), whereby the oil dam 130 can be fixed to the stator 10.

A portion of a side 131 of the oil dam 130 is a curved surface that can be attached to the outer circumferential surface of the stator core 11, and an opening 132 may be formed through at least a portion of the bottom surface of the oil dam 130 to expose the outer circumferential surface of the lower end of the stator core 11.

As described above, a portion of the side 131 of the oil dam 130 is a curved surface and the curved portion can be attached to the outer circumferential surface of the stator core 11. Further, the opening 132 is formed through the bottom surface of the oil dam 130, so it is possible to prevent deformation of the oil dam 130 due to the weight of the oil in the oil dam 130.

Further, the front side of the oil dam 130 is a wall 133 blocking the lower end of the stator core 11 and the lower end of the coil 14 at the front, and a portion at the center of the bottom surface of the oil dam 130 that is in contact with the lower end of the wall 133 may be a flat surface 134 rather than a curved surface.

The flat surface 134 is a portion that is the bottom surface of a space positioned ahead of the lower end of the stator core 11 and the lower end of the coil 14, and the space formed by the flat surface 134 and the wall 133 of the front side together with the left and right sides 131 of the oil dam 130 not attached to the outer circumferential surface of the stator core 11 is a space that is filled with oil.

Accordingly, the lower end of the stator core 11 and the lower end of the coil 14 can be immersed and cooled in the oil in the space.

When the front side wall 133 of the oil dam 130 is too high, the stator 20 is also suck in the oil therein and additional drag may occur, so in order to prevent this problem, the front side wall 133 may be formed such that the height is smaller by a predetermined value than the height of the inner side of the coil 14, for example, by minimum 3 mm.

Figure 13:
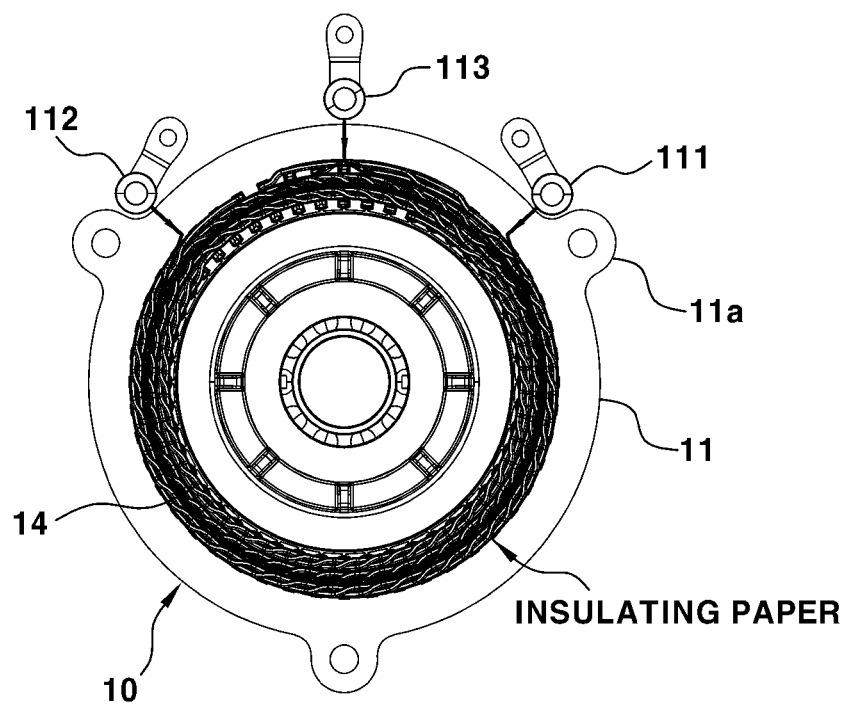
FIG. 13 is a rear view showing that oil is sprayed from a rear side of a motor in oneform of the present disclosure.

On the other hand, FIG. 13 shows the rear side of the motor 11, in which the flow of oil sprayed from the holes at the rear portions of the first pipe 111 (at the right side in FIG. 13), the second pipe 112 (at the left side in FIG. 13), and the third pipe 113 is indicted by arrows.

Figure 14:
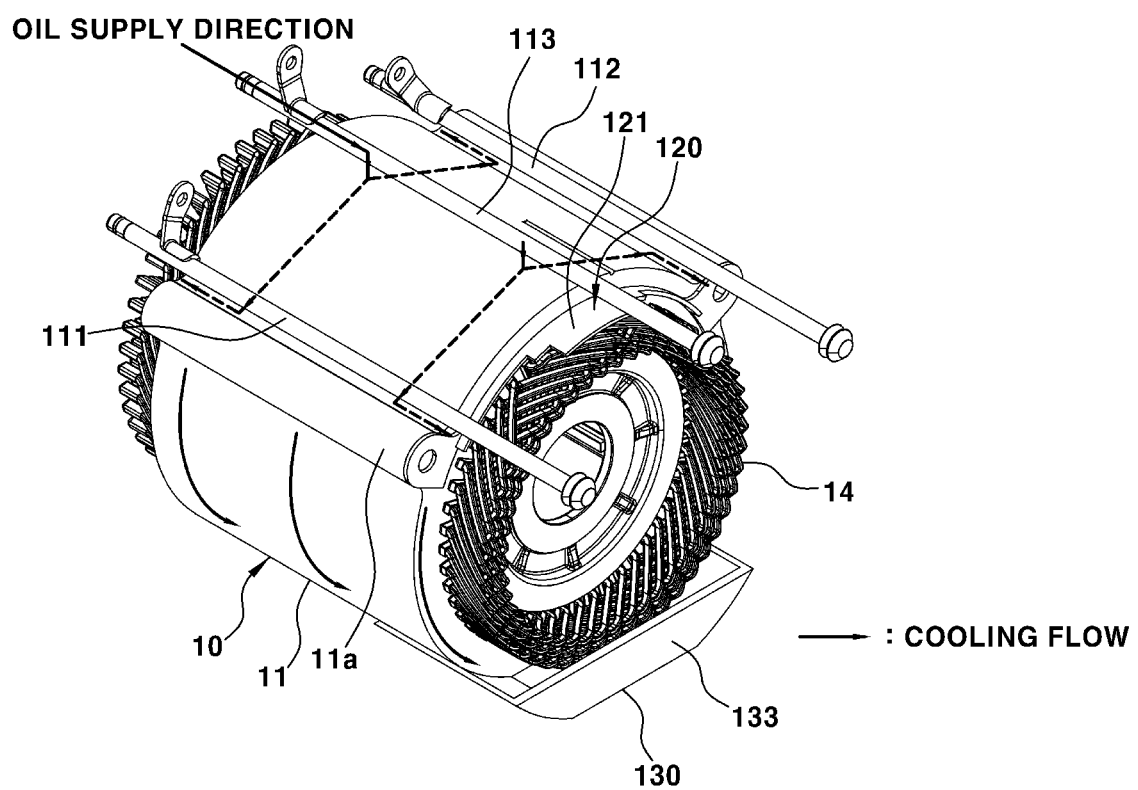
FIG. 14 is a perspective view showing a flow path of oil that is sprayed from a third pipe of a motor in oneform of the present disclosure.

FIG. 14 is a perspective view showing the flow direction path of oil sprayed from the hole at the middle portion of the third pipe 113.

On the rear side of the motor 1, unlike the front side, as shown in FIG. 13, there is no bus bar, the shape of the coils 14 is uniform, and there are an insulating paper and a hairpin molding structure between the coils, so there is an effect that oil spreads and flows by the insulating paper and the hairpin molding structure.

However, in order to achieve more efficient cooling in some forms of the present disclosure, the front-rear positions of the holes at the pipes from which oil is sprayed, the positions and spray angles in the cross-sections of the pipe, the numbers of the holes, etc. are optimized so that the amount of oil that is sprayed from the rear side can be saved and the saved oil can be intensely sprayed to the front side that requires higher cooling performance.

The third pipe 113 that is a newly added in some forms of the present disclosure sprays oil vertically downward toward the stator core 11 at the center portion over the stator 10 through the holes 114 so that the sprayed oil can wet the entire stator core 11 while flowing downward on the top surface, the sides, and the front-rear end surfaces of the stator core 11 (see FIG. 14).

In order that the sprayed oil can uniformly spread on the stator core 11, the position of the holes 114 of the third pipe 113 is set to be positioned at about ¼ point and ¾ point of the front-rear length of the stator core 11 (see FIG. 7).

Further, when oil is sprayed from the holes 114 at the middle portion B of the third pipe 113, the oil is sprayed to the upper portion and the center portion of the stator core 11 at a predetermined angle by the oil supply pressure and the oil spray pressure at the middle position, so it is possible to form the holes 114 of the third pipe 113 to be positioned at a predetermined distance, for example, at a distance of 2.5 mm, toward the oil supplier (that is, rearward) from the target positions (¼ point and ¾ point) in consideration of the spray angles.

Further, as for the size of the holes 114 of the third pipe 113, the holes may be formed to have a diameter of 2 mm larger than the holes (for example, a diameter of 1.5 mm) at the front portion C and the rear portion of the pipe to smoothly supply oil to the entire stator core 11.

Figure 15:
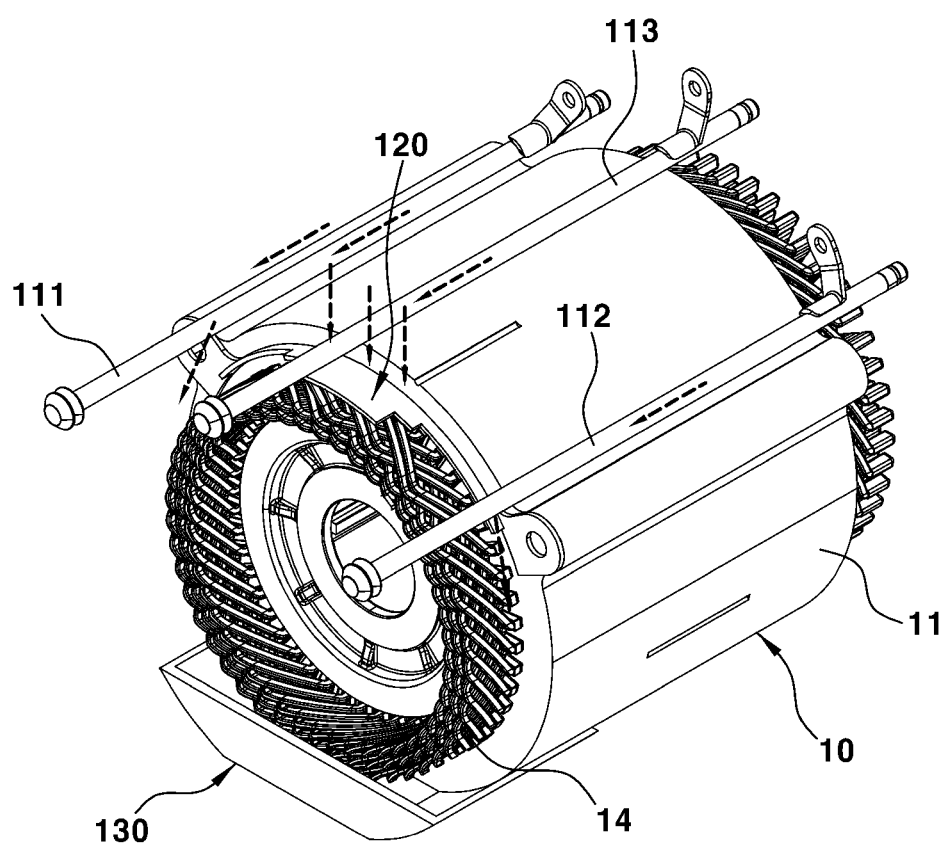
FIGS. 15 and 16 are perspective views showing flow paths of oil sprayed from spray pipes of a motor in oneform of the present disclosure.
Figure 16:
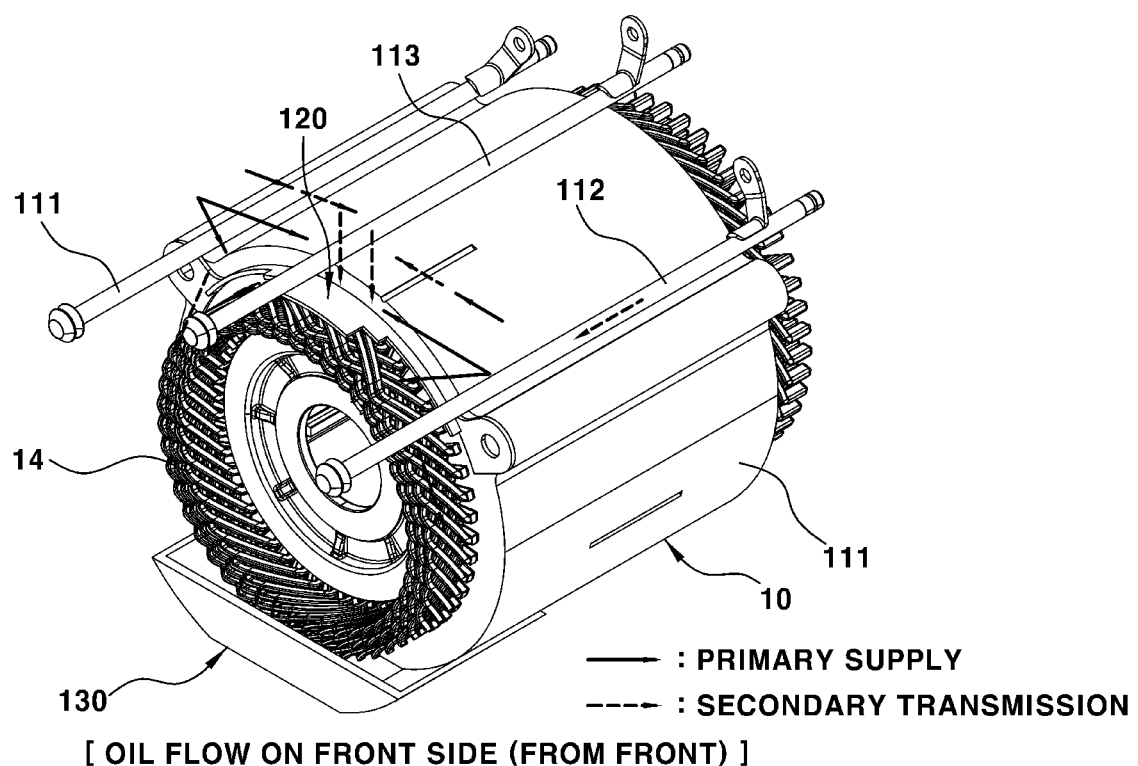
Figure 17:
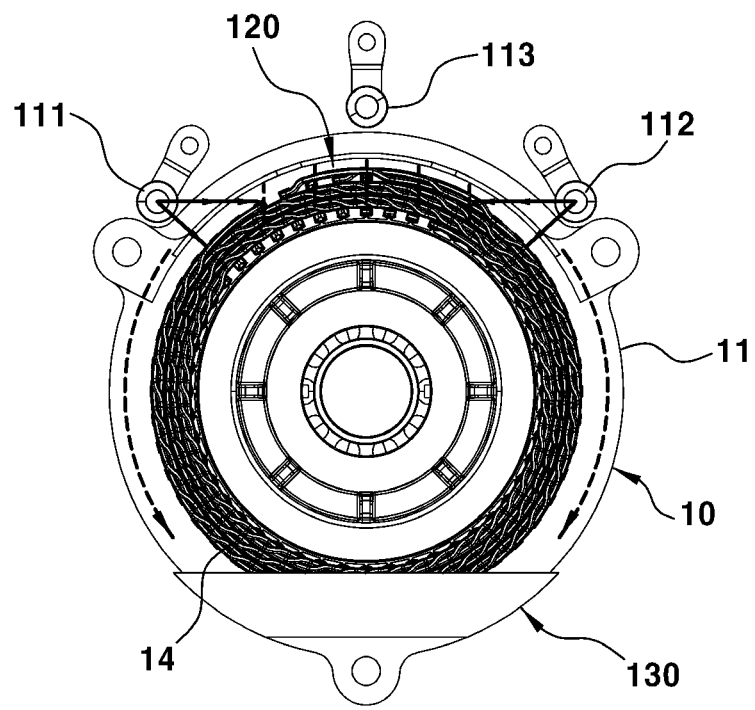
FIG. 17 is a front view showing oil spray and a flow path on the front side of a motor in oneform of the present disclosure.

Next, FIGS. 15 to 17 show the front side of the motor, in which the flow of oil sprayed through the holes 114 of the pipes 111, 112, and 113 is indicated by arrows.

In some forms of the present disclosure, oil flowing to the front side of the stator core 11 from over and the left-right center portions of the stator 10 meets the oil guide 120.

The oil flowing from 12 o'clock of the front side of the stator 10 flows down through the gap of 2 mm between the oil guide 120 and the front end surface of the stator core 11, thereby wetting the core front end surface and the coil at the center portion.

The oil flowing from 2 o'clock and 10 o'clock flows down on the oil guide 120, moves to the front end surface of the stator core 11 from both ends of the oil guide 120, and then cools the front end surface of the stator core 11 and the coil 14 while flowing down.

Further, oil that is double the amount of oil sprayed to the rear side is sprayed to the front side of the motor 1, as described above.

Further, a hole for spraying oil is not formed at the front portion of the third pipe 113 to prevent foil from flying at the front side of the motor, and 12 o'clock of the front side of the motor is cooled while oil is sprayed from the front portion hole of the first pipe 111 and the front portion hole of the second pipe 112 and then flows along the oil guide 120.

The front portion holes of the first pipe 111 and the second pipe 112 are composed of a hole for directly spraying oil toward the coil 14 (that is, a hole for spraying oil downward at an angle) and a hole for spraying oil toward the oil guide 12 (that is, hole for horizontally spraying oil), and the directions of the oil that is sprayed from the holes are shown in FIGS. 16 and 17, and the positions and spray angles of the holes 114 are shown in FIG. 7.

In some forms of the present disclosure, oil sprayed to the stator 10 and then flows down is temporarily collected in the oil dam 130 disposed under the motor 1 such that the lower portion of the motor is immersed in the oil in the oil dam 130, thereby maximizing the cooling performance for the lower portion.

Since the height of the oil dam 130 is lower than the height of the inner circumferential surface of the lower end of the coil 14, thereby preventing drag that may be generated when the rotor 20 is immersed in the oil.

Figure 18:
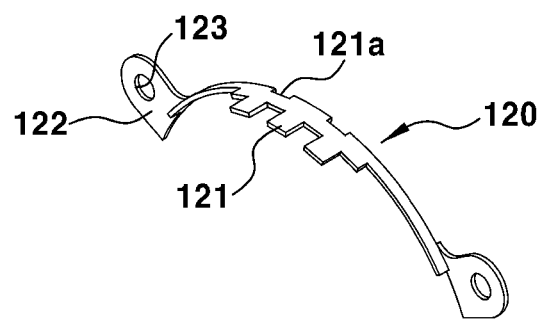
FIGS. 18 to 20 are perspective views showing another form of the oil guide in a cooling system of a motor in oneform of the present disclosure.
Figure 19:
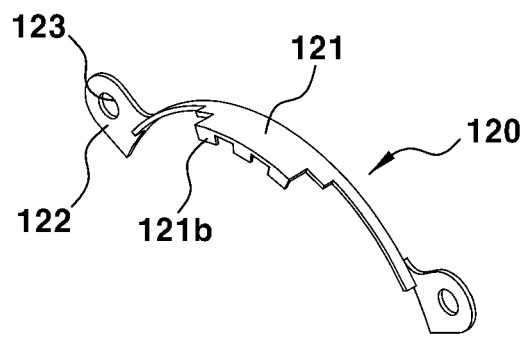
Figure 21:
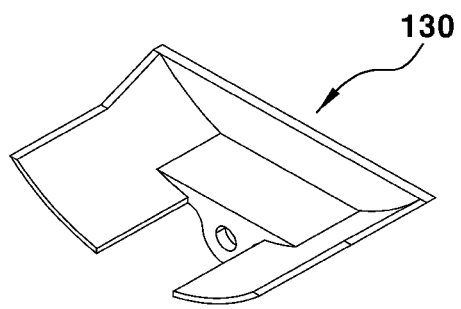
FIG. 21 is a perspective view showing another form of the oil guide in a cooling system of a motor in oneform of the present disclosure.

FIGS. 18 and 19 are perspective views showing another form of the oil guide in a cooling system of a motor in some forms of the present disclosure, and FIG. 21 is a perspective view showing another form of the oil guide in a cooling system of a motor in some forms of the present disclosure.

In some forms of the present disclosure, the oil guide 120 that induces and guides flow of oil can be installed to be able to have a gap from the front end surface of the stator core 11 when the oil guide is disposed at the front side of the motor.

The oil guide exemplified in FIG. 18 additionally has one or a plurality of recessed grooves 121a along the edge facing the front end surface of the stator core 11, so a larger gap can be defined between the front end surface of the stator core 11 and the oil guide 20 by the groove 121a.

In particular, the position and the depth of the groove 121a can be set in consideration of portions vulnerable in cooling, and the larger the depth of the groove 121a, the larger the gap from the front end surface of the stator core 11 at the corresponding portions.

As described above, it is possible to make the size of the gap between the oil guide 120 and the front end surface of the stator core 11 different at predetermined positions in the longitudinal direction of the oil guide 120 in consideration of the portions vulnerable in cooling, and accordingly, it is possible to more efficiently distribute and supply cooling oil.

The oil guide exemplified in FIG. 19 has a blocking portion protruding downward and bending downward along the front edge and the blocking portion blocks the oil flying forward after hitting the stator core.

Since the blocking portion is formed, generation of an oily layer can be induced between the oil guide and the coil, and the oil flying to the blocking portion by hitting the coil returns to the coil by hitting the blocking portion, whereby the oil can be reused for cooling.

Further, a plurality of blocking portions protruding downward is arranged with predetermined gaps in the longitudinal direction of the oil guide, so it is possible to effectively prevent oil from dropping in a lump at one point at 12 o'clock and it is possible to induce movement of oil such that the oil can be distributed and dropped to desired positions.

Figure 20:
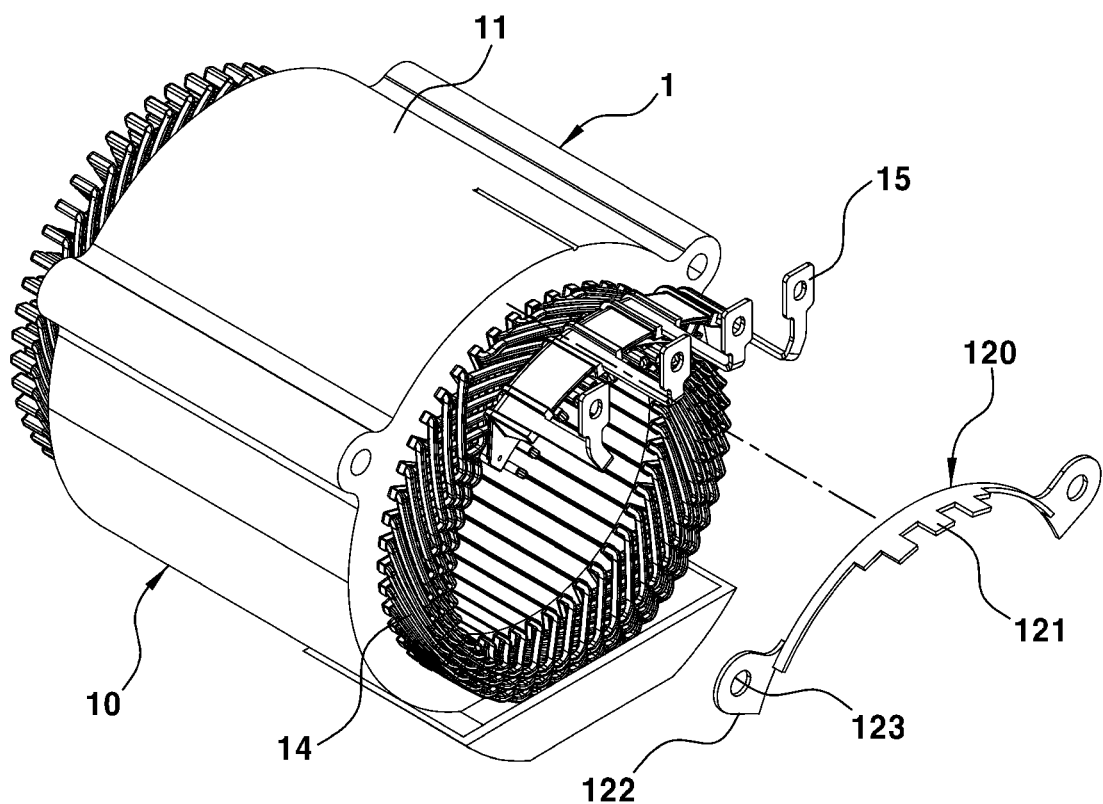

Further, a plurality of enlarging portions may be formed with predetermined gaps in the longitudinal direction of the oil guide, as exemplified in FIG. 20.

On the other hand, FIG. 21 shows the upper ends of the sides of the oil dam are inclined downward, which is a modification for prevent backflow of oil due to the angle of a vehicle when the vehicle is driven on an uphill slope.

When a vehicle is driven on an uphill slope, the oil sprayed and collected in the oil dam may flow over the oil dam to the stator due to the angle of the vehicle, and the oil flowing over the oil dam to the stator may cause a loss (drag) of the rotor together with oil locking phenomenon.

In some forms of the present disclosure, as shown in FIG. 21, the upper ends of the sides of the oil dam are inclined, so oil that may cause drag in an inclined structure can be discharged faster to the outside, so drag that may be caused at the rotor can be removed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A motor comprising:
a cooling system configured to cool a stator with coils wound on a stator core,
wherein the cooling system includes a plurality of spray pipes having a plurality of holes,
wherein the plurality of spray pipes sprays oil through the plurality of holes,
wherein the plurality of spray pipes is positioned between the stator and a housing of the motor, and
wherein the plurality of spray pipes includes pipes disposed at a center over the stator and at both sides spaced apart from each other in a circumferential direction of the stator from the center with predetermined gaps therebetween,
wherein the plurality of spray pipes includes:
a first pipe elongated forward and rearward at a left side above the stator;
a second pipe elongated forward and rearward at a right side above the stator; and
a third pipe elongated forward and rearward at the center above the stator,
wherein the plurality of holes is formed at a rear portion of each of the first pipe and the second pipe to spray the oil to a portion of the coils protruding rearward from a rear end of the stator core,
wherein the plurality of holes is formed at a front portion of each of the first pipe and the second pipe to spray the oil to a portion of the coils protruding forward from a front end of the stator core,
wherein one hole of the plurality of holes is formed at the rear portion of each of the first pipe and the second pipe,
wherein the one hole of the plurality of holes is formed to spray the oil at an angle,
wherein the first pipe and the second pipe are configured to spray the oil to a first portion of the stator, and the third pipe is configured to spray the oil to a part of the first portion and a second portion of the stator, wherein the second portion of the stator is different from the first portion of the stator, and
wherein the first pipe and the second pipe are configured to only spray the oil to a front portion and a rear portion of the stator, and the third pipe is configured to only spray the oil to a middle portion and the rear portion of the stator.

2. The motor of claim 1, wherein the plurality of holes is formed at the third pipe and is arranged in a longitudinal direction of the third pipe, and
the plurality of holes sprays the oil downward toward the stator core under the third pipe.

3. The motor of claim 2, wherein the plurality of holes includes:
a hole formed at a rear portion of the third pipe to spray the oil vertically downward to a portion of the coils protruding rearward from a rear end of the stator core; and
a hole formed at a front-rear middle portion of the third pipe to spray the oil vertically downward to the stator core.

4. The motor of claim 3, wherein the hole formed at the front-rear middle portion of the third pipe is disposed at least one position of equally divided positions when a front-rear direction of the stator core is equally divided.

5. The motor of claim 4, wherein the hole formed at the front-rear middle portion of the third pipe is disposed at a ¼ point and a ¾ point of a front-rear length when the front-rear direction of the stator core is equally divided into four sections.

6. The motor of claim 1, wherein
at least two holes of the plurality of holes are formed to be positioned in a same cross-section.

7. The motor of claim 6, wherein at least one hole of the plurality of holes formed to be positioned in the same cross-section is formed to spray the oil horizontally or in a predetermined first inclination direction close to the horizon and the other hole is formed to spray the oil in a second inclination direction that is a direction set downward further than the first inclination direction, and
the other holes positioned behind the holes positioned in the same cross-section are formed to spray the oil horizontally or in a predetermined third inclination direction.

8. The motor of claim 1, wherein two holes of the plurality of holes are formed at the rear portion of each of the first pipe and the second pipe, and one hole of the two holes is formed to horizontally spray the oil and another hole of the two holes is formed to spray the oil downward at an angle.

9. The motor of claim 1, wherein the cooling system further includes:
an oil guide disposed at an upper portion of a front side of the stator core in a circumferential direction of the stator core and guiding flow of oil sprayed from the holes of the spray pipes.

10. The motor of claim 9, wherein the oil guide is disposed over a portion of the coils protruding forward from a front end of the stator core to guide flow of oil sprayed toward the portion of the coils protruding forward through the holes of the spray pipes.

11. The motor of claim 9,
wherein the oil guide is configured to flow at least some of oil, which is sprayed to the stator core through a hole of the spray pipe disposed at the center over the stator, from a surface of the stator core to a surface of the oil guide, and
the oil guide is configured to direct the oil flowing along the surface of the oil guide to the stator core or the coils for cooling.

12. The motor of claim 9, wherein the oil guide is a plate-shaped member having an arc shape to be disposed in a circumferential direction of the stator core, and has an enlarged portion having a greater width than other portions at a center portion.

13. The motor of claim 12, wherein the oil guide is disposed such that a gap through which the oil sprayed to a top surface of the oil guide flows down is formed between the oil guide and a front end surface of the stator core.

14. The motor of claim 12, wherein a blocking portion that protrudes to block oil returning after hitting the coils is formed at the oil guide.

15. The motor of claim 1, wherein the cooling system further includes: an oil dam disposed under the stator to collect the oil at a predetermined level therein such that a lower portion of the stator is immersed in the oil.

16. The motor of claim 15, wherein the oil dam is formed such that a portion of a side of the oil dam is curved to be attached to an outer circumferential surface of the stator core, and an opening is formed through at least a portion of a bottom surface of the oil dam to expose an outer circumferential surface of a lower end of the stator core.

17. The motor of claim 16, wherein a wall blocking the lower end of the stator core and a lower end of the coils at a front is formed on a front side of the oil dam, and a front side wall of the oil dam has a height that is smaller by a predetermined value than a height of an inner side of the coils.

* * * * *